United States Patent
Ricca

(12) 
(10) Patent No.: US 6,645,613 B1
(45) Date of Patent: Nov. 11, 2003

(54) COATING COMPOSITIONS FOR USE ON SUBSTRATES

(75) Inventor: Anthony R. Ricca, Merrick, NY (US)

(73) Assignee: Spraylat Corporation, Pelham, NY (US)

( * ) Notice: Subject to any disclaimer, the term of this patent is extended or adjusted under 35 U.S.C. 154(b) by 0 days.

(21) Appl. No.: 09/534,896

(22) Filed: Mar. 24, 2000

Related U.S. Application Data

(60) Provisional application No. 60/129,092, filed on Apr. 13, 1999.

(51) Int. Cl.⁷ .......................... B32B 5/16; B32B 27/40; C08K 3/08; H01B 1/22; B05D 7/00
(52) U.S. Cl. .................. 428/328; 427/212; 427/218; 428/323; 428/423.1; 524/439; 252/512; 252/513; 252/514
(58) Field of Search .......................... 428/423.1, 323, 428/328; 524/439; 427/212, 218; 252/512, 513, 514

(56) References Cited

U.S. PATENT DOCUMENTS

| | | | | |
|---|---|---|---|---|
| 5,114,485 A | * | 5/1992 | Lynch et al. | 106/311 |
| 5,480,480 A | * | 1/1996 | Lynch et al. | 106/311 |
| 5,786,033 A | * | 7/1998 | Gast et al. | 427/412.1 |
| 6,187,384 B1 | * | 2/2001 | Wilke et al. | 427/388.4 |

* cited by examiner

*Primary Examiner*—D. S. Nakarani
(74) *Attorney, Agent, or Firm*—Richard R. Muccino

(57) ABSTRACT

The present invention is directed to a coating composition comprising a pigment, a water-dispersible urethane resin, and a solvent effective amount of a water-soluble solvent. The water-dispersible urethane resin exists as a colloidal dispersion in water but when mixed with a water-soluble solvent swells to provide a dispersion having a viscosity sufficiently high in the solvent so as to maintain the pigment in suspension in the solvent for a time sufficient to apply the coating composition. The present invention is also directed to a method for coating a substrate with the novel coating composition and to a coated substrate prepared by the novel method.

18 Claims, No Drawings

COATING COMPOSITIONS FOR USE ON SUBSTRATES

This application claims the benefit of Provisional Application No. 60/129,092 filed Apr. 13, 1999.

FIELD OF THE INVENTION

The present invention is directed to a coating composition comprising a pigment, a water-dispersible urethane resin, and a solvent effective amount of a water-soluble solvent. The water-dispersible urethane resin exists as a colloidal dispersion in water but when mixed with a water-soluble solvent swells to provide a dispersion having a viscosity sufficiently high in the solvent so as to maintain the pigment in suspension in the solvent for a time sufficient to apply the coating composition. The present invention is also directed to a method for coating a substrate with the novel coating composition and to a coated substrate prepared by the novel method.

DESCRIPTION OF THE BACKGROUND

Certain electronic appliances, such as cellular phones and computers, require a thin coating of a conductive metal around their internal components, such as inside the housing, to shield the internal components. These conductive coatings may be applied to the inside of the housing by spraying, brushing, dipping, rolling, or screen printing a coating composition of finely divided, conductive metal particles suspended in a liquid vehicle. Spraying is a preferred method of applying the conductive coating because it is fast and can lay down uniform, thin layers on intricately shaped parts. Subsequently, the coating composition is dried at ambient or an elevated temperature.

The conductive coating composition is generally a mixture of an adhesive resin and a conductive metal such as silver, nickel, or copper, in an aqueous or organic medium. Traditionally, the solvent medium for the coating composition has been an organic compound in the aromatic or ketone family. Some organic compound-based vehicles, however, have many draw-backs such as toxicity, flammability, and are subject to environmental regulatory standards. the expense to purchase and to discard the organic solvent. In addition, some organic solvents, such as methyl ethyl ketone, methyl i-butyl ketone, and toluene) tend to attack solvent sensitive substrates such as substrates made of plastic polycarbonate and polycarbonate blends including those used in the housing of cellular phones and computers. Aqueous-based mediums, on the other hand, tend to be slow to dry and are impractical for large scale production.

U.S. Pat. No. 4,622,269 (Leung et al.) discloses a process for manufacturing contacts formed of an electrically conductive metal and a minor amount of graphite or cadmium oxide. The process comprises forming a mixture of finely divided electrically conductive metal and graphite or cadmium oxide, and compressing the mixture into a body having a working surface and an obverse side. The working surface is adapted to contact another electrically conductive surface and the obverse side is adapted to be secured to an electrically conductive support. The obverse side of the body is coated with a thin layer of the finely divided electrically conductive metal and the coated contact is sintered at a temperature less then the melting point of the electrically conductive metal to secure the electrically conductive metal to the working surface. Leung et al. describes an example employing the use of a slurry of silver powder in an aqueous alcoholic solution of Carbowax.

U.S. Pat. No. 5,089,173 (Frentzel et al. '173) discloses a thermally curable conductive polymeric thick film composition. The composition comprises by weight (a) about 3–15 parts of a thermoplastic vinyl acetate/vinyl chloride/dicarboxylic acid multipolymer resin; (b) a second thermoplastic resin selected from the group consisting of (i) about 1–6 parts of a thermoplastic polyurethane resin; (ii) about 2–10 parts of a thermoplastic polyester resin; and (iii) about 1–10 parts of a mixture of a thermoplastic polyurethane and a thermoplastic polyester resin; (c) about 0.05–1 parts of a tertiary amine; (d) an effective dissolving amount of an organic solvent; and (e) about 50–80 parts of silver flake. Frentzel et al. '173 states that the organic solvents employed may be nonhydrocarbon polar solvents such as acetone and methyl ethyl ketone.

U.S. Pat. No. 5,141,777 (Frentzel et al. '777) discloses a method of curing a polymer thick film on a substrate. The method comprises the steps of providing a polymer thick film composition comprising, by weight (a) about 3–15 parts of at least one thermoplastic vinyl acetate/vinyl chloride/dicarboxylic acid multipolymer resin; (b) a second thermoplastic resin selected from the group consisting of (i) about 1–6 parts of at least one thermoplastic polyurethane resin; (ii) about 3–10 parts of at least one thermoplastic polyester resin; or (iii) about 1–10 parts of a mixture of at least one thermoplastic polyurethane and at least one polyester resin; (c) about 0.05–1 parts of a tertiary amine; (d) at least one organic solvent capable of substantially dissolving (a), (b), and (c) ingredients; and (e) about 50–80 parts silver flake. The polymer thick film composition is then applied to a substrate and cured onto the substrate by exposing the coated substrate to an elevated temperature. Frentzel et al. '777 states that the organic solvents employed may be nonhydrocarbon polar solvents such as acetone and methyl ethyl ketone.

U.S. Pat. No. 5,286,415 (Buckley et al.) discloses an aqueous conductive polymeric thick film-forming and printable composition. The composition comprises (a) about 0.25% to about 20% by weight of a water-soluble thermoplastic polymer selected from the group consisting of polyethyloxyazoline, polyvinyl pyrrolidone, polyvinyl alcohol, polyacrylamide, polyglycol, and polyacrylic acid; (b) about 10 to 70% by weight of a water-insoluble polymer dispersion in water selected from the group consisting of polyurethane resin polymer, acrylic resin polymer, polyester resin polymer, and vinyl resin polymer; (c) about 2% to about 20% by weight of a glycol compound drying retarder agent; (d) an effective amount conductive particles selected from the group consisting of conductive metal particles, carbon black particles, and graphite particles; and (e) an effective solvating amount of water to dissolve the water-soluble thermoplastic polymer. Buckley et al. states that the polyurethane resin polymer employed is a water-insoluble polymer.

U.S. Pat. No. 5,399,547 (Negm et al.) discloses a method for increasing the critical current density carried by a high transition temperature superconductive material. The method comprises providing an elongated article of high transition temperature superconductive material; providing a noble metal in fragmented form selected from the group consisting of silver, gold, and platinum; applying the noble metal fragments as a superficial coating over the external surface of the elongated article of high transition temperature superconductive material; heating the superficial coating of noble metal fragments upon the external surface of the elongated article of high transition temperature superconductive material to a temperature greater than the softeningpoint temperature and less than the melting-point temperature of the noble metal such that the heated noble metal fragments of the superficial coating soften, migrate over, and superficially cover the external surface of the elongated article and become superficially embedded within the high transition temperature superconductive material; and allowing the heated noble metal superficial covering on the external surface of the elongated article of high transition temperature superconductive material to cool and solidify.

U.S. Pat. No. 5,425,969 (Wakabayashi et al.) discloses a method for coating an article made of polypropylene with an electrically conductive primer and thereafter electrostatically applying an organic solvent overcoat composition to the resulting coating. The conductive primer comprises (A) a urethane-modified chlorinated polypropylene which is a mixture or addition reaction product of a chlorinated polypropylene and a polyurethane resin, (B) a melamine resin, (C) a polyester resin, and (D) an electrically conductive substance. Wakabayashi et al. discloses the use of a urethane- modified chlorinated polypropylene.

U.S. Pat. No. 5,492,653 (Hochheimer et al.) discloses a coating composition of silver flake in an aqueous vehicle for applying a coating of an electrically conductive metal on a resistive or dielectric substrate. The coating composition consists essentially of (a) about 30 to about 80 wt % silver flake coated with a lubricant comprising at least one straight-chain carboxylic acid having from 6 to 18 carbon atoms; (b) about 1.5 to about 4.0 wt% substantially completely water-soluble polymer binder; (c) about 0.5 to about 8.0 wt % of substantially completely water soluble co-solvent; and (d) water. Hochheimer et al. states that the water-soluble polymer binder is an acrylic polymer.

U.S. Pat. No. 5,658,499 (Steinberg et al.) discloses a coating composition of silver flake in an aqueous vehicle for applying a coating of an electrically conductive metal on a resistive or dielectric substrate. The coating composition consists essentially of (a) about 30 to about 80 wt % silver flake in the form of lamellar particles having a long dimension of about 15 um coated with a lubricant comprising a straight-chain carboxylic acid having from 6 to 18 carbon atoms; (b) about 1.5 to about 4.5 wt % substantially completely water-soluble polymer binder selected from the group consisting of acrylic polymer and acrylic copolymer, the polymer binder including an effective amount of a neutralizing agent selected from the group consisting of alkali and amine to neutralize the coating composition to a pH of about 7 to about 12: (c) a dispersing effective amount of a co-solvent, surfactant and defoamer additive, and anti-settling agent; and (d) water. Steinberg et al. states that the water-soluble polymer binder is an acrylic polymer.

U.S. Pat. No. 5,756,008 (Slutsky et al.) discloses a silver composition comprising (a) 40–85% by weight silver powder; (b) 2 to 6% by weight of water-soluble polymer; (c) 0.5% by weight of organic water-soluble solvent; and (d) 0.1 to 3% by weight of inorganic binder. The total polymer binder contained in the composition, when in the form of a dry square having sides of 2.5 cm and a thickness of 0.005 cm disposed on a substrate, will dissolve and form a clear phase when submerged in water at 50° C. for 5 minutes. Slutsky et al. states that the water-soluble polymer may be polyvinylpyrrolidone; vinyl acetate and 1-hexadecene; hydroxypropyl cellulose; or hydroxymethyl cellulose, and hydroxyethyl cellulose.

U.S. Pat. No. 5,786,033 (Gast et al.) discloses a method of forming multi-layer paint films on a substrate. The method comprises A) applying to the substrate a base coat composition which is aqueous and which contains pigment; B) forming a paint film of the composition; C) applying a transparent top coat over the base coat paint film; and D) baking the base coat and the top coat at the same time. The base coat composition comprises (a.) an aqueous polyurethane resin having a solid fraction having structural units represented by the general formula and dispersed in water: —O—CO—NH—Y—NH—CO—O—; Y represents an aromatic, aliphatic or alicyclic hydrocarbyl group and (b.) an inorganic rheology control agent of which a 3% by weight aqueous solution exhibits an electrical conductivity of 700–900 uS/cm. Gast et al. discloses the use of a broad range of aqueous polyurethane resins.

SUMMARY OF THE INVENTION

The present invention is directed to a coating composition comprising in percentages by weight of the total composition:

(a) a pigment present in an amount from about 5% to about 95%;

(b) a water-dispersible urethane resin present in an amount from about 1% to about 40%; and (c) a solvent effective amount of a water-soluble solvent; wherein the water-dispersible urethane resin may be represented by Formula (1):

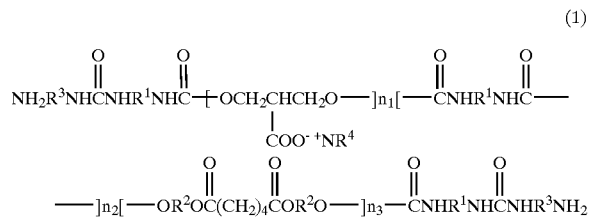

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2; and (iii) the molecular weight of the water-dispersible urethane resin is from about 100,000 to about 200,000.

In another embodiment, the invention is directed to a method for coating a substrate with a coating composition which comprises the steps of:

(1) providing a coating composition comprising in percentages by weight of the total composition:

(a) a pigment present in an amount from about 5% to about 95%;

(b) a water-dispersible urethane resin present in an amount from about 1% to about 40%; and (c) a solvent effective amount of a water-soluble solvent; wherein the water-dispersible urethane resin may be represented by Formula (1):

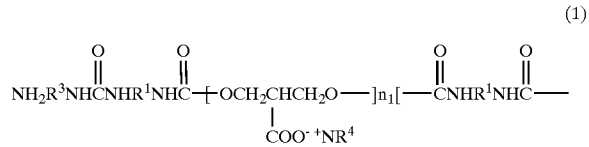

-continued

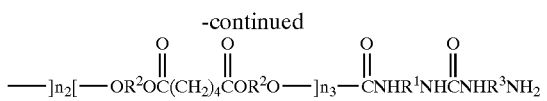

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2; and (iii) the molecular weight of the water-dispersible urethane resin is from about 100,000 to about 200,000; and (2) applying the coating composition to a substrate.

In still another embodiment, the invention is directed to a coated substrate prepared by a method which comprises the steps of:

(1) providing a coating composition comprising in percentages by weight of the total composition:
(a) a pigment present in an amount from about 5% to about 95%;
(b) a water-dispersible urethane resin present in an amount from about 1% to about 40%; and
(c) a solvent effective amount of a water-soluble solvent; wherein the water-dispersible urethane resin may be represented by Formula (1):

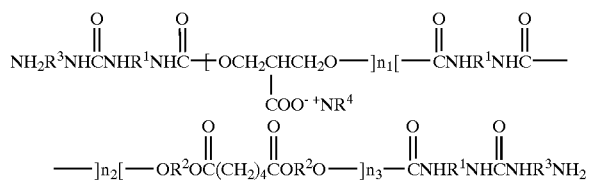

(1)

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2; and (iii) the molecular weight of the water-dispersible urethane resin is from about 100,000 to about 200,000; and (2) applying the coating composition to a substrate.

DETAILED DESCRIPTION OF THE INVENTION

The present invention pertains to coating compositions for use on substrates especially solvent sensitive substrates such as plastics. The coating compositions comprise a pigment, a water-dispersible urethane resin, and a solvent effective amount of a water-soluble solvent. The water-dispersible urethane resin exists as a colloidal dispersion in water but when mixed with a water-soluble solvent swells to provide a dispersion having a viscosity sufficiently high in the solvent so as to maintain the pigment in suspension in the solvent for a time sufficient to apply the coating composition. The use of the novel water-dispersible urethane resin avoids the use of a thickener agent which would adversely affect the properties of the pigment and the resin. The mild water-soluble solvent, such as alcoholic solvents, employed in the coating composition does not attack plastic substrates. The present invention is also directed to a method for coating a substrate with the novel coating composition and to a coated substrate prepared by the novel method.

The coating compositions of the present invention are novel because they may be formulated in mild alcoholic solvents and are safe for use on plastic substrates. The coating compositions need not contain methyl ethyl ketone or other strong solvents which can attack solvent-sensitive substrates, such as polycarbonate and polycarbonate blends. The mild alcoholic solvents are fast drying solvent which is important in high volume production. The resulting dried films are extremely hard, tough, and durable, and when used as conductive coatings, can tolerate the higher built-in stresses in molded parts, and provide unequaled shielding at less than 0.5 mil (12.5 microns) dry film thickness. The sprayable coating compositions can be applied to a substrate by spraying the composition onto a substrate followed by removing the solvent in a low temperature drying step at ambient or slightly higher temperature. After drying, the pigment will be firmly adhered to the substrate. Because of the high viscosity of the coating compositions of the present invention, the coating compositions are easier to apply and the products prepared with the coating compositions have better performance properties. The coating compositions are easier to apply because the high viscosity of the coating compositions reduces sagging and running during application. The products prepared with the coating compositions have better performance properties because the high viscosity of the coating compositions maintains the pigment at the surface of the film during the drying process rather than allowing it to sink to the bottom of the film which often happens with conventional coating compositions. This latter property is especially important when the pigment is a conductive metal because maintaining the conductive metal at the surface of the film provides a substrate with better conductivity. Desirable properties in a coating composition include good cohesiveness and adhesiveness to the substrate.

In accord with the present invention, a coating composition is provided which comprises, in percentages by weight of the total composition, (a) a pigment present in an amount from about 5% to about 95%; (b) a water-dispersible urethane resin present in an amount from about 1% to about 40%; and (c) a solvent effective amount of a water-soluble solvent.

Pigments are generally substances in dry powder form that may impart color to another substance or to a mixture. Most pigments are insoluble in organic solvents and water with the exception of the natural organic pigments such as chlorophyll. In general, to qualify as a pigment, a material must have positive colorant value. This definition excludes whiting, barytes, clays, and talc. Some pigments (zinc oxide, carbon black) are also reinforcing agents. However, in the paint and rubber industries, these distinctions are not always observed. Pigments may be classified as follows. Inorganic: (a) metallic oxides (iron, titanium, zinc, cobalt, chromium); (b) metal powder suspensions (silver, copper, nickel, gold, aluminum); (c) earth colors (siennas, ochers, timbers); and (d) lead chromates. Organic: (a) animal (rhodopsin, melanin); (b) vegetable (chlorophyll, xanthophyll, litmus, flavon, carotene); (c) mineral (carbon black); and (d) synthetic (phthalocyanine, lithols, toluidine, pare red, toners, lakes, etc.). In a preferred embodiment, the pigment is a conductive metal.

Conductive metals are compounds that have the ability to transfer heat or electricity from one point to another within a material, or from one material to another, when both materials are in physical contact, in the absence of motion in the medium. In metallic conductors, the current is carried by a flow of electrons from atom to atom with the atomic nuclei remaining stationary. The conductive metal in the coating compositions of the present invention may be selected from a wide variety of conductive metals. Nonlimiting illustrative specific examples of conductive metals may be selected from the group consisting of silver, copper, nickel, gold, aluminum, and combinations thereof. In a preferred embodiment, the conductive metal is selected from the group consisting of silver, copper, nickel, and combinations thereof. In a more preferred embodiment, the conductive metal is selected from the group consisting of silver, copper, and combinations thereof. When silver is employed in the present invention, the silver component is preferably finely divided flake which is generally milled into thin flat particles with an average long dimension in the range from about 1 $\mu$m to about 50 $\mu$m.

The amount of pigment used in the present invention is an effective amount to coat, a coatingly effective amount, and may vary depending upon the amount recommended or permitted for the particular pigment as well as for the particular end use of the substrate. For example, when the pigment is a conductive metal, the amount employed is a conductively effective amount. In general, the amount of pigment present is the ordinary amount required to obtain the desired result. Such amounts are known to the skilled practitioner in the arts and are not a part of the present invention. In a preferred embodiment, the pigment in the coating composition is present in an amount from about 5% to about 95%, preferably from about 10% to about 80%, more preferably from about 20% to about 70%, and most preferably from about 35% to about 50%, by weight.

The water-dispersible urethane resin exists as a colloidal dispersion in water but when mixed with a water-soluble solvent swells to provide a dispersion having a viscosity sufficiently high in the solvent so as to maintain the pigment in suspension in the solvent for a time sufficient to apply the coating composition to a substrate. The water-dispersible urethane resin may be represented by Formula (1):

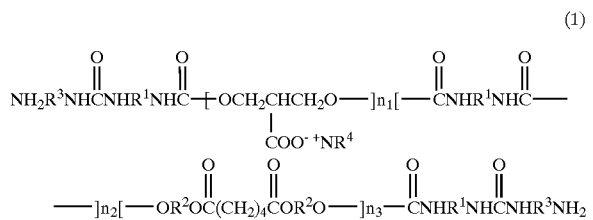

(1)

In Formula (1), $R^1$ is a straight chain alkyl group having from about 6 to about 15 carbon atoms, preferably from about 7 to about 13 carbon atoms, and more preferably from about 8 to about 10 carbon atoms. $R^2$ is a straight chain alkyl group having from about 5 to about 10 carbon atoms, preferably from about 6 to about 9 carbon atoms, and more preferably from about 7 to about 9 carbon atoms. $R^3$ is a straight chain alkyl group having from about 2 to about 6 carbon atoms, preferably from about 2 to about 5 carbon atoms, and more preferably from about 2 to about 4 carbon atoms. $^+NR^4$ is selected from the group consisting of $^+NH_4$ and amine salts having from about 1 to about 9 carbon atoms, preferably from about 2 to about 8 carbon atoms, and more preferably from about 2 to about 6 carbon atoms.

The polyester polyol residues in Formula (1) associated with $n_1$ and $n_3$ (HOR$^2$O(O)C(CH$_2$)$_4$C(O)OR$^2$OH and HOCH$_2$CH(COOH)CH$_2$OH) may be present in any order, that is the polyol residues are interchangeable with the aliphatic diioscyanate group (OCNR$^1$NCO). The ratio of $n_1$:$n_2$:$n_3$ is from about 0.2:1:0.8 to about 0.8:1:0.2, preferably from about 0.3:1:0.7 to about 0.7:1:0.3, and more preferably from about 0.4:1:0.6 to about 0.6:1:0.4.

In Formula (1), the molecular weight of the water-dispersible urethane resin is from about 100,000 to about 200,000, preferably from about 125,000 to about 200,000, and more preferably from about 150,000 to about 200,000, Z average molecular weight.

The water-dispersible urethane resins may be prepared from an aliphatic diioscyanate (OCNR$^1$NCO) and a polyester polyol (HOR$^2$O(O)C(CH$_2$)$_4$C(O)OR$^2$OH). The NCO/OH ratio is set significantly>1 to create a low molecular weight fluid prepolymer with terminal NCO groups. The polyol component includes a sufficient amount of dimethylol propionic acid (HOCH$_2$CH(COOH)CH$_2$OH) so that the product will be a low-molecular weight water-dispersible urethane resin. The acid group in the dimethylol propionic acid is subsequently neutralized with an amine (R$^4$NH) to create internal surfactant sites to emulsify and disperse the polymer. The water-dispersible polymer with terminal NCO groups is then further reacted with a multifunctional amine (NH$_2$R$^3$NH$_2$) to yield a polyurea portion of the chain. A preferred water-dispersible urethane resin is sold under the tradename Q-Thane QW18-1 and is available from Pierce & Stevens Corp.

The time sufficient to apply a coating composition to a substrate may vary depending upon the particular water-dispersible urethane resin, pigment, and substrate. In general, the time sufficient to apply a coating composition to a substrate may range from 1 minute to 10 hours, preferably 1 minute to 5 hours, and more preferably from 1 minute to 3 hours.

The amount of water-dispersible urethane resin used in the present invention is an effective amount to bind the pigment to the substrate and may vary depending upon the amount recommended or permitted for the particular water-dispersible urethane resin, pigment, or substrate. In general, the amount of water-dispersible urethane resin present is the ordinary amount required to obtain the desired result. Such amounts are known to the skilled practitioner in the arts and are not a part of the present invention. In a preferred embodiment, the water-dispersible urethane resin in the coating composition is present in an amount from about 1% to about 40%, preferably from about 2% to about 20%, more preferably from about 3% to about 12%, and most preferably from about 4% to about 7%, by weight.

The water-soluble solvents of the present invention are solvents that are capable of forming a suspension with the water-dispersible urethane resin and the pigment, are quick drying, and preferably do not attack the substrate on which it is being coated. Non-limiting illustrative examples of water-soluble solvents include methyl alcohol, ethyl alcohol, n-propyl alcohol, i-propyl alcohol, acetone, ethyl acetate, and methyl ethyl ketone. Preferably, the water-soluble solvent is an alcoholic solvent selected from the group consisting of methyl alcohol, ethyl alcohol, n-propyl alcohol, and i-propyl alcohol. More preferably, the alcoholic solvent is ethyl alcohol. The water-soluble solvents may also be aqueous mixtures of water-soluble solvents. In another embodiment, the water-soluble solvent is acetone.

The coating composition of the present invention may also contain additives selected from among a wide variety of conventional additives including surfactants such as defoamers and anti-settling agents. Such surfactant additives help disperse the pigment in the solvent vehicle. Surfactants and defoamer additives may be present in the coating composition in an amount from about 0.3% to about 6.0%, by weight of the coating composition.

The coating composition can be prepared using conventional equipment. The coating composition can be sprayed, dipped, or applied to the substrate by other traditional methods. Preferably, the coating compositions of this invention are applied by spraying. After application, the coating composition is dried which causes the resin to form a film that adheres the pigment as a layer on the substrate. Typically, drying is performed at a temperature from ambient to about 200° F., preferably up to about 150° F., more preferably up to about 100° F., and most preferably up to about 75° F. Drying continues until most, usually at least about 95%, of the solvent evaporates.

The coating compositions of the present invention may be used to apply a conductive pigment layer on an otherwise low- or non-conductive substrate in the electronics industry. The coating compositions are particularly useful for applying a conductive metal around the internal components of cellular phones and computers, and other electronic devices requiring EMI and RFI shielding. The substrates of the present invention may be selected from the group consisting of polycarbonate and acrylo/nitrile/butadiene substrates, and combinations thereof.

In a specific embodiment, the present invention is directed to a method for coating a substrate with a coating composition which comprises the steps of:

(1) providing a coating composition comprising in percentages by weight of the total composition:
(a) a pigment present in an amount from about 5% to about 95%;
(b) a water-dispersible urethane resin present in an amount from about 1% to about 40%; and
(c) a solvent effective amount of a water-soluble solvent; wherein the water-dispersible urethane resin may be represented by Formula (1):

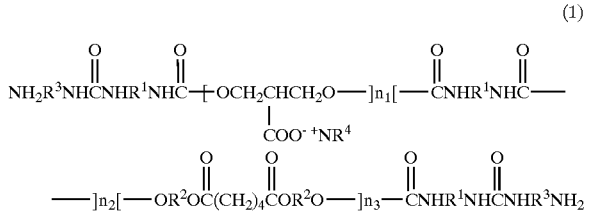

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2; and (iii) the molecular weight of the water-dispersible urethane resin is from about 100,000 to about 200,000; and (2) applying the coating composition to a substrate.

In another specific embodiment, the present invention is directed to a coated substrate prepared by a method which comprises the steps of:

(1) providing a coating composition comprising in percentages by weight of the total composition:
(a) a pigment present in an amount from about 5% to about 95%;
(b) a water-dispersible urethane resin present in an amount from about 1% to about 40%; and
(c) a solvent effective amount of a water-soluble solvent; wherein the water-dispersible urethane resin may be represented by Formula (1):

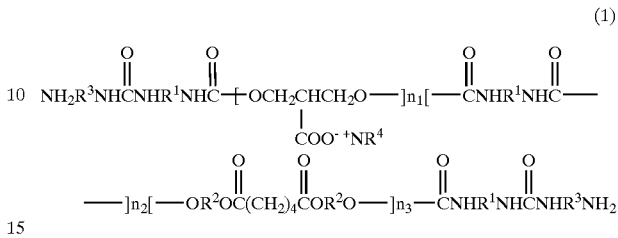

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2; and (iii) the molecular weight of the water-dispersible urethane resin is from about 100,000 to about 200,000; and (2) applying the coating composition to a substrate.

Throughout this application, various publications have been referenced. The disclosures in these publications are incorporated herein by reference in order to more fully describe the state of the art.

The present invention is further illustrated by the following examples which are not intended to limit the effective scope of the claims. All parts and percentages in the examples and throughout the specification and claims are by weight of the final composition unless otherwise specified.

EXAMPLES

These examples illustrate the preparation of a coating composition prepared in accord with the present invention and a conventional coating composition not in accord with the present invention.

Two coating compositions, Example A and Example B, were prepared by admixing a water-dispersible urethane resin dispersion (16 parts, 35–40% solids) in ethyl alcohol (50 parts) to provide a dispersion having 8–9% solids. The water-dispersible urethane resin dispersion in Example A was QW18-1 (available from Pierce & Stevens Corp.) and the water-dispersible urethane resin dispersion in Example B was QW20-1 (available from Pierce & Stevens Corp.). QW18-1 and QW20-1 are water-dispersible urethane resins having the same structure except that for QW18-1, $R^2$ in Formula (1) is a straight chain alkyl group having 10 carbon atoms, and for QW20-1, $R^2$ in Formula (1) is a straight chain alkyl group having 2 carbon atoms. The physical properties of the two compositions are set out below. Viscosity was measured on a Brookfield LVT Viscometer using a #3 spindle @ 12 rpm.

|  | Example A | Example B |
| --- | --- | --- |
| Viscosity as supplied | 25–350 cps | 25–550 cps |
| Tensile strength | 5000 psi | 3600 psi |
| Elongation | 360% | 200% |

-continued

| | Example A | Example B |
|---|---|---|
| Viscosity in ethyl alcohol #3 spindle @ 12 rpm | 2500 cps | <10 cps |

As set out above, the coating composition of Example A, containing the water-dispersible urethane resin dispersion QW18-1, has a viscosity sufficiently high in the solvent so as to maintain a pigment in suspension in the solvent for a time sufficient to apply the coating composition. The coating composition of Example B, containing the water-dispersible urethane resin dispersion QW20-1, does not have a sufficiently high viscosity in the solvent so as to maintain a pigment in suspension.

The invention being thus described, it will be obvious that the same may be varied in many ways. Such variations are not to be regarded as a departure from the spirit and scope of the invention and all such modifications are intended to be included within the scope of the following claims.

I claim:

1. A conductive coating composition consisting essentially of in percentages by weight of the total composition:
    (a) a conductive metal present in an amount from about 5% to about 95%;
    (b) a water-dispersible urethane resin present in an amount from about 1% to about 40%; and
    (c) a solvent effective amount of a water-soluble solvent; wherein the water-dispersible urethane resin may be represented by Formula (1).

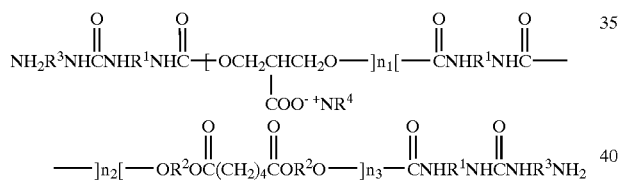

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2; and (iii) the molecular weight of the water-dispersible urethane resin is from about 100,000 to about 200,000, Z average molecular weight.

2. The coating composition according to claim 1, wherein the conductive metal is selected from the group consisting of silver, copper, nickel, gold, aluminum, and combinations thereof.

3. The coating composition according to claim 1, wherein $R^1$ is a straight chain alkyl group having from about 7 to about 13 carbon atoms; $R^2$ is a straight chain alkyl group having from about 6 to about 9 carbon atoms; $R^3$ is a straight chain alkyl group having from about 2 to about 5 carbon atoms; $^+NR^4$ is selected from the group consisting of $^+NH_4$ and amine salts having from about 2 to about 8 carbon atoms; the ratio of $n_1:n_2:n_3$ is from about 0.3:1:0.7 to about 0.7:1:0.3; and (iii) the molecular weight of the water-dispersible urethane resin is from about 125,000 to about 200,000.

4. The coating composition according to claim 3, wherein $R^1$ is a straight chain alkyl group having from about 8 to about 10 carbon atoms; $R^2$ is a straight chain alkyl group having from about 7 to about 9 carbon atoms; $R^3$ is a straight chain alkyl group having from about 2 to about 4 carbon atoms; $^+NR^4$ is selected from the group consisting of $^+NH_4$ and amine salts having from about 2 to about 6 carbon atoms; the ratio of $n_1:n_2:n_3$ is from about 0.4:1:0.6 to about 0.6:1:0.4; and the molecular weight of the water-dispersible urethane resin is from about 150,000 to about 200,000.

5. The coating composition according to claim 1, wherein the water-soluble solvent is selected from the group consisting of methyl alcohol, ethyl alcohol, n-propyl alcohol, i-propyl alcohol, acetone, ethyl acetate, and methyl ethyl ketone.

6. The coating composition according to claim 5, wherein the water-soluble solvent is selected from the group consisting of methyl alcohol, ethyl alcohol, n-propyl alcohol, and i-propyl alcohol.

7. The coating composition according to claim 1, wherein the conductive metal is present in an amount from about 10% to about 80%.

8. The coating composition according to claim 1, wherein the water-dispersible urethane resin is present in an amount from about 2% to about 20%.

9. A method for coating a substrate with a conductive coating composition which consists essentially of the steps of:
    (1) providing a conductive coating composition comprising in percentages by weight of the total composition:
        (a) a conductive metal present in an amount from about 5% to about 95%;
        (b) a water-dispersible urethane resin present in an amount from about 1% to about 40%; and
        (c) a solvent effective amount of a water-soluble solvent; wherein the water-dispersible urethane resin may be represented by Formula (1):

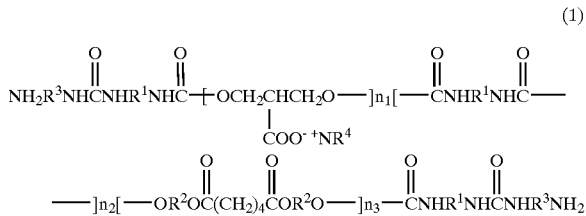

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2, and (iii) the molecular weight of the water-dispersible urethane resin is from about 100,000 to about 200,000, Z average molecular weight; and
    (2) applying the coating composition to a substrate.

10. The method according to claim 9, wherein the conductive metal is selected from the group consisting of silver, copper, nickel, gold, aluminum, and combinations thereof.

11. The method according to claim 9, wherein $R^1$ is a straight chain alkyl group having from about 7 to about 13 carbon atoms; $R^2$ is a straight chain alkyl group having from about 6 to about 9 carbon atoms; $R^3$ is a straight chain alkyl group having from about 2 to about 5 carbon atoms; $^+NR_4$ is selected from the group consisting of $^+NH^4$ and amine salts having from about 2 to about 8 carbon atoms; the ratio of $n_1:n_2:n_3$ is from about 0.3:1:0.7 to about 0.7:1:0.3; and (iii) the molecular weight of the water-dispersible urethane resin is from about 125,000 to about 200,000.

12. The method according to claim 11, wherein $R^1$ is a straight chain alkyl group having from about 8 to about 10 carbon atoms; $R^2$ is a straight chain alkyl group having from about 7 to about 9 carbon atoms; $R^3$ is a straight chain alkyl group having from about 2 to about 4 carbon atoms; $^+NR_4$ is selected from the group consisting of $^+NH4$ and amine salts having from about 2 to about 6 carbon atoms; the ratio of $n_1:n_2:n_3$ is from about 0.4:1:0.6 to about 0.6:1:0.4; and the molecular weight of the water-dispersible urethane resin is from about 150,000 to about 200,000.

13. The method according to claim 9, wherein the water-soluble solvent is selected from the group consisting of methyl alcohol, ethyl alcohol, n-propyl alcohol, i-propyl alcohol, acetone, ethyl acetate, and methyl ethyl ketone.

14. The method according to claim 13, wherein the water-soluble solvent is selected from the group consisting of methyl alcohol, ethyl alcohol, n-propyl alcohol, and i-propyl alcohol.

15. The method according to claim 9, wherein the conductive metal is present in an amount from about 10% to about 80%.

16. The method according to claim 9, wherein the water-dispersible urethane resin is present in an amount from about 2% to about 20%.

17. The method according to claim 9, wherein the substrate is selected from the group consisting of polycarbonate and acrylonitrile-butadiene-styrene thermoplastic resins, and combinations thereof.

18. A conductive coated substrate prepared by a method which consists essentially of the steps of:

(1) providing a conductive coating composition comprising in percentages by weight of the total composition:
  (a) a conductive metal present in an amount from about 5% to about 95%;
  (b) a water-dispersible urethane resin present in an amount from about 1% to about 40%; and
  (c) a solvent effective amount of a water-soluble solvent; wherein the water-dispersible urethane resin may be represented by Formula (1):

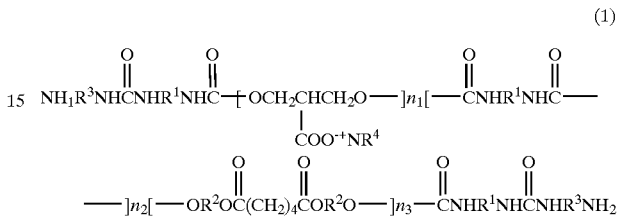

wherein (i) $R^1$ is a straight chain alkyl group having from about 6 to about 15 carbon atoms; $R^2$ is a straight chain alkyl group having from about 5 to about 10 carbon atoms; $R^3$ is a straight chain alkyl group having from about 2 to about 6 carbon atoms; $^+NR^4$ is selected from the group consisting of $^+NH_4$ and amine salts having from about 1 to about 9 carbon atoms; (ii) the ratio of $n_1:n_2:n_3$ is from about 0.2:1:0.8 to about 0.8:1:0.2, and (iii) the molecular weight of the water-dispersible urethane resin is from about 100,000 to about 200,000, Z average molecular weight; and (2) applying the coating composition to a substrate.

* * * * *